United States Patent [19]
Fleming

[11] Patent Number: 5,953,542
[45] Date of Patent: Sep. 14, 1999

[54] PHOTOGRAPHER'S BACKDROPS AND METHODS FOR MAKING SAME

[76] Inventor: Dianne S. Fleming, 15 St. Paul's Pl., Garden City, N.Y. 11530

[ * ] Notice: This patent is subject to a terminal disclaimer.

[21] Appl. No.: 08/821,462

[22] Filed: Mar. 21, 1997

Related U.S. Application Data

[63] Continuation-in-part of application No. 08/433,922, May 2, 1995, Pat. No. 5,619,299.

[51] Int. Cl.⁶ .................................................. G03B 15/00
[52] U.S. Cl. ................................................................ 396/3
[58] Field of Search ................................................ 396/1, 3

[56] References Cited

U.S. PATENT DOCUMENTS

| | | |
|---|---|---|
| 439,512 | 10/1890 | Howe . |
| 445,805 | 2/1891 | Entrekin . |
| 596,312 | 12/1897 | Badgley . |
| 624,111 | 5/1899 | Snow ........................................... 396/3 |
| 1,180,682 | 4/1916 | Wheelock . |
| 2,186,533 | 1/1940 | Lange ........................................... 396/3 |
| 5,619,299 | 4/1997 | Fleming-Schaub ........................ 396/3 |

*Primary Examiner*—David M. Gray
*Attorney, Agent, or Firm*—Galgano & Burke

[57] ABSTRACT

A photographer's backdrop includes a spunbonded olefin material which is prepared according to several methods. According to one method of preparing the material, the material is softened by crushing it to break down the fibers in the material and render it more supple prior to the application of paint or dye. According to another method of preparing the material, acrylic paint, spray enamel, or soluble dye is applied to the material. After the material is completely dried, it is crushed (again) to assure a soft supple quality. Preferred aspects of the invention include: using a spunbonded olefin having the characteristics of DuPont TYVEK® #1422R which has one side which is relatively absorbent and another side which is non-absorbent, applying paint or dye to the relatively absorbent side of the TYVEK®, and crushing the TYVEK® before and after painting or dyeing. The backdrops according to the invention are light weight, can be used flat without ironing, are opaque but can be made semi-opaque with back lighting, are smoothly drapable without wrinkling, may be walked upon, are flame retardant, can be wiped clean of light dirt, and be compressed to a small package without wrinkling.

20 Claims, 8 Drawing Sheets

| | HEAVY MUST BE ROLLED OR FOLDED | MEDIUM WEIGHT MUST BE ROLLED OR FOLDED FOR TRANSPORT | TRANS-LUSCENT OR SHEER IN NATURAL LIGHT | COM-PLETELY OPAQUE | CAN BE USED FLAT WITHOUT IRONING | AT LEAST 10 FEET WIDE AND SEAMLESS | CAN BE SEMI-OPAQUE WITH BACKLIGHT | SMOOTH DRAPE-ABILITY WITHOUT WRINKLES | DESIGNED TO BE WALKED UPON | FLAME RE-TARDANT | LIGHT WEIGHT | CRUSHES TO A SMALL BALL WITH EASE | WIPEABLE OF LIGHT DIRT |
|---|---|---|---|---|---|---|---|---|---|---|---|---|---|
| PAINTED CANVAS | YES | NO | NO | YES | YES | YES | NO | NO | YES | NO | NO | NO | YES |
| PAINTED/UNPAINTED COTTON MUSLIN | YES | YES | NO | YES | NO | YES | YES | NO | YES | NO | NO | NO | NO |
| WOODPULP PAPER ALLOVER COLOR PRINTED/PAINTED | NO | YES | NO | YES | YES | NO | YES | NO | NO | NO | NO | NO | NO |
| FROSTED PLASTIC | NO | YES | YES | NO | YES | NO | NO | NO | NO | YES | NO | NO | YES |
| WOVEN PARACHUTE SILK/NYLON UNPAINTED | NO | NO | YES | NO | YES | NO | YES | YES | NO | NYLON ONLY | YES | YES | NO |
| KNITTED TRICOT PAINTED/UNPAINTED | NO | NO | YES | NO | YES | YES | YES | YES | NO | YES | YES | YES | NO |
| SPUNKNITTED NETTING DYED/UNPAINTED | NO | NO | YES | NO | NO | NO | YES | NO | NO | YES | YES | YES | NO |

FIG. 1  PRIOR ART

PHOTOGRAPHER'S BACKDROPS AND METHODS FOR MAKING SAME

This application is a continuation-in-part of U.S. patent application Ser. No. 08/433,922, filed May 2, 1995, now U.S. Pat. No. 5,619,299.

BACKGROUND OF THE INVENTION

1. Field of the Invention

The invention relates to photographer's backdrops and to methods of making photographer's backdrops. More particularly, the invention relates to a particular material which is surprisingly well suited for use as a photographer's backdrop and to methods of preparing that material for such use.

2. State of the Art

Photographer's backdrops are generally large sheet materials and which may be supplied on a roll or folded flat. The backdrops may be painted or unpainted and vary in weight. Backdrops are chosen for a variety of characteristics depending on the artistic intent or purpose of the photographer. Typical backdrops include: sheer or translucent layerable synthetic fabrications, flat paper, cotton muslin cloth, or flat canvas. Each has unique photographic qualities of opacity or translucence, drapeability, and versatility. Some opaque backdrops may become semi-opaque when illuminated from behind, i.e. backlit, with very bright light. Translucent backdrops can have varying degrees of sheerness verging on transparency under normal lighting conditions. The drapeability of a backdrop is a quality of softness which allows easy manipulation to create a set design without heavy wrinkles or creases which may distract from the subject of the photograph. Versatility is the ability to service a variety of needs and create many different looks with a single material.

Prior art FIG. 1 is a table indicating the characteristics of various known backdrop material. The first three italicized characteristics (Heavy, Medium Weight, and Translucency in Natural Light) are generally not preferred whereas the other characteristics are preferred. It will be noted that each of the listed materials has at least one negative characteristic and that none of the listed materials posses more than six of the ten preferred characteristics. While FIG. 1 indicates that wood pulp paper is not designed to be walked on, if it is used as such it must be thrown away thereafter.

The preferred characteristics are chosen to be such because they add versatility to the backdrop allowing it to be used on location as well as in the studio. A light weight backdrop is preferred for on location shooting because it must be transported to the location. Unfortunately, all of the light weight prior art backdrops are also translucent under normal light. While this translucency may be acceptable in the studio, it is generally undesirable on location. A completely opaque backdrop is preferable for location shooting. Unfortunately, the opaque backdrops are relatively heavy and lack versatility and they are even heavier when painted.

Canvas backdrops are typically non-drapeable and mounted on a wooden dowel in lengths of five to twenty feet. They are very heavy and difficult to transport. For example, even a small 6'×7' canvas backdrop may weigh from six to ten pounds and is difficult to maneuver through doorways and the like.

Cotton muslin is lighter than canvas, but easily wrinkles even careful handling will not avoid wrinkling. Even with careful handling, muslin requires ironing prior to use to appear smooth or must be used with undesirable heavy wrinkles showing.

SUMMARY OF THE INVENTION

It is therefore an object of the invention to provide an opaque cloth backdrop which weighs less than existing cloth backdrops.

It is also an object of the invention to provide a synthetic cloth backdrop which is easily painted, dyed, or printed.

It is another object of the invention to provide a light weight cloth backdrop which retains minute amounts of wrinkles, which wrinkles may be eliminated by re-crushing to make the backdrop appear flat without ironing.

It is also an object of the invention to provide a backdrop which is at least ten feet wide and seamless.

It is still another object of the invention to provide a synthetic cloth backdrop which is more easily backlit than muslin for a semi-opaque appearance.

It is another object of the invention to provide a backdrop which is smoothly drapeable without wrinkling.

It is also an object of the invention to provide a backdrop which may be walked upon without damaging the backdrop.

It is still another object of the invention to provide a backdrop which is flame retardant.

It is another object of the invention to provide a backdrop which may be wiped clean of light dirt.

It is also an object of the invention to provide a backdrop which may be crushed into a small package without wrinkling.

In accord with these objects which will be discussed in detail below, the photographer's backdrop of the present invention includes a spunbonded olefin which is prepared according to several methods. According to one method of preparing the material, the material is softened by crushing it through hand or machine manipulation or commercial laundering to break down the fibers in the material and render it more supple prior to the application of paint or dye. According to another method of preparing the material, acrylic paint, spray enamel, commercial printing, or water soluble dye is applied to the material. After the material is completely dried, it is crushed (again) to assure a soft supple quality. According to still another method of preparing the material, two hems are provided at opposite ends of a 10'×10' or larger piece of the material and one hem is optionally curved or angled to provide a built-in drape.

Preferred aspects of the invention include: using a spunbonded olefin having the characteristics of DuPont TYVEK® #1422R which has one side which is textured and relatively absorbent and another side which is slick and non-absorbent, applying paint or dye to the relatively absorbent side of the Tyvek® without adding more than one pound to the weight of the backdrop, and crushing the TYVEK® before and after painting. The backdrops according to the invention are light weight, can be used flat without ironing, are opaque but can be made semi-opaque with back lighting, are smoothly drapable without wrinkling, may be walked upon, are flame retardant, can be wiped clean of light dirt, and be compressed to a small package. Additional objects and advantages of the invention will become apparent to those skilled in the art upon reference to the detailed description taken in conjunction with the provided figures

BRIEF DESCRIPTION OF THE DRAWINGS

FIG. 1 is a table showing prior art backdrop materials and their characteristics;

DETAILED DESCRIPTION OF THE PREFERRED EMBODIMENTS

Figure 2:
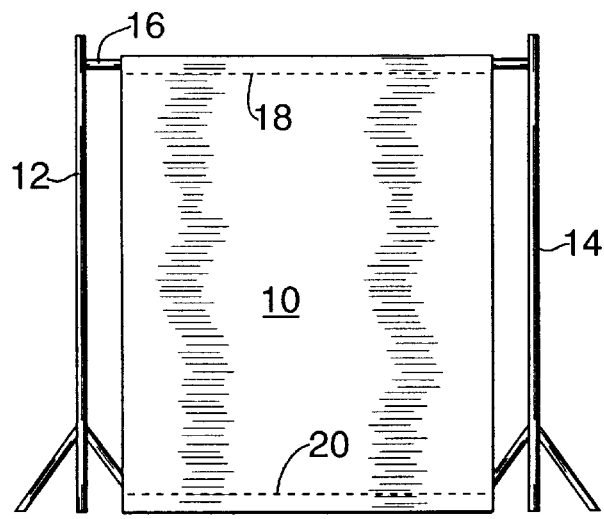
FIG. 2 is a side elevation view of a hanging backdrop according to the invention having two straight hems.

According to the presently preferred embodiment, DuPont TYVEK® material style 1422R is obtained in either ten foot or five foot wide rolls. This material has a paper-like quality and has the following properties according to DuPont:

| | | |
|---|---|---|
| Basis Weight, oz/sq.yd. | 1.2 | |
| Thickness, mils | 5.3 | |
| ±3 Sigma Range | 2.3–8.3 | |
| Strip Tensile | | |
| (MD), lbs./in. | 7.9 | |
| (CD), lbs./in. | 9.3 | |
| Work to Break | | |
| (MD), lbs./in. | 2.2 | |
| (CD), lbs./in. | 4.3 | |
| Tongue Tear | | |
| (MD), lbs./in. | 2.1 | |
| (CD), lbs./in. | 2.5 | | where MD is machine direction and CD is cut direction. The material has a bright optic white color. One side of the material is slick and non-absorbent and the other side has microscopic pores, has a dry feel, and is relatively absorbent.

The material is cut to a suitable backdrop size, e.g. from 6'×7' for a small portrait backdrop, 5'×7' for a tabletop product, to 10'×20' or more for a large set design. The cut sheet material is subjected to crushing either by mechanical manipulation of the material either by hand or machine or by laundering it until it is soft and supple. Care should be taken when laundering so that temperatures do not exceed about 150° F. The material is then provided with one or more hems as described below with reference to FIGS. 2–4 to provide an opaque optic white backdrop which may be wiped clean of light dirt.

If desired, prior to hemming, an acrylic paint or water soluble dye is applied to the relatively absorbent side of the cut sheet material according to any of a number of methods which are described below. While the slick side of the material is relatively non-absorbent, it is possible to color the slick side as well as the absorbent side by submersing the material in a dye bath. The painted/dyed material is dried flat. After the material is completely dry, two hems are added as described below with reference to FIGS. 2–4. The material is then re-crushed to insure a soft supple quality.

According to an alternative embodiment of the invention, the cut sheet material is painted and/or dyed before it is crushed. In this embodiment, the cut sheet material is fastened by tape or tacks to a flat surface and paint and/or dye is applied to the material in a controlled manner as described in more detail below. The painted/dyed material is dried flat. After the material is completely dry, two hems are added as described below with reference to FIGS. 2–4. The material is then crushed to insure a soft supple quality.

The preferred embodiments of painting the material utilize an acrylic paint which is mixed with water in the following proportions:

| | |
|---|---|
| For dark colors | 1 part paint to 3 parts water; |
| For medium tones | 1 part paint to 6 parts water; |
| For light shades | 1 part paint to 10 parts water; |
| For just a hint of color | 1 part paint to 15 parts water. |

The paint may be applied to the material either before or after crushing, as mentioned above. The paint may be applied to the material using any of the following methods, alone or in combination:

For bold applications, the paint may be applied with a roller;

For soft color blending, the paint may be applied with a sponge;

For an overall even color, the material may be submersed in the paint solution;

For speckling paint onto the material, a long hair cleaning brush may be used to layer paint onto the material with or without subsequent hand manipulation;

For streaking colors together, a normal paint brush may be used;

For other effects, an air brush or a spray gun may be used; when using a sprayer, a stencil or a lacy fabric may be placed over the material so that acrylic or enamel paint is sprayed through it using one to three colors to create an hombre pattern (i.e. a soft blend of three colors which run into each other in a random pattern).

As mentioned above, the material may be submersed in a paint solution using a similar process to conventional dyeing. In particular, acrylic paint and water can be mixed to compose a "pigment dye", e.g., having about 1 part paint to about 4 parts water, to about 1 part paint to about 8 parts water, and variations thereof, to create a dye bath. Desirably, preparation of the material by laundering or hand crushing softens the fabric enabling the material to readily absorb the "pigment dye". Advantageously, while the material is still damp from laundering or hand crushing, the material is placed into a warm to hot dye bath. In addition, agitation of the material or dye bath during this process aids in evenly dispersing the color. From one to several colors can be applied this way.

A preferred embodiment of dyeing the material utilizes chemical dyestuffs which are capable of combining with the textile fiber molecule, usually when in solution with a carrier agent. Since the spunbonded olefin material is naturally "hydrophobic" (less than 0.1 percent moisture retained) it is preferable to use alcohol instead of water as the carrier agent. A mixture of alcohol and dye (e.g., a dispersed dye normally used in water) gives better saturation by displacing air in between the fibers of the material with its natural capillary action and adhering to surfaces of the fibers throughout the fabric. Preferred examples of the carrier agent include low molecular weight alcohols, isopropyl, phenol and combinations thereof.

From the present description it will be appreciated to those skilled in the art that the darkness or lightness of color in dyeing, known as the depth of shade, is dependant on the quantity of dye used in ratio to the fiber weight being dyed. Also, as described above, desirably the material being dyed or the dye solution is agitated so that the dye molecules combine with the material uniformly to produce an even color. Advantageously, the material can be agitated (i.e., mechanically manipulated) during the dyeing process thereby eliminating the need to precrush or prelaunder the material prior to the dyeing process. In addition, the dyeing process may include the application of heat preferably below a temperature of about 275 degrees Fahrenheit, the temperature at which the material melts.

The process of disperse dyeing of spunbonded olefin material using disperse dyes can be performed using either a continuous supply of fabric from a roll, or using precut pieces of fabric. For example, the process for disperse dyeing of an approximately 10'×10' piece of spunbonded olefin material (one pound weight) requires the following ingredients:

| | |
|---|---|
| 2 gallons | water and alcohol based solution to act as a "carrier" for the dye agents. Preferably about ⅓ part alcohol to about ⅔ water, up to about ½ part alcohol to about ½ part water. As pointed out above, the use of alcohol provides deep absorption of the dye into the fabric compared to using only water, although it is possible to dye without the use of alcohol. |
| 1 to 10 Teaspoons | disperse dye powder, depending on the desired shade. Less for lighter colors and more for richer brighter color. Also, variations within the color spectrum are possible when mixing various powders to achieve a desired color. |
| 2-½ Teaspoons | acetic acid (optional) to aid in the absorption of the dye. |

The dyeing process involves heating the water to about 100 degrees and mixing the remaining ingredients together. The sheet of spunbonded olefin material is then immersed in the dyeing solution. A prelaundered sheet will require less agitation at this time than an unlaundered sheet. After complete saturation, the temperature is raised to a boil (below the melting point of the fabric) for absorption and permanency of color. The dyed sheet is then dried by hanging or tumbling in a dryer with no heat. With disperse dyeing both sides of the sheet will be colored.

Figure 3:
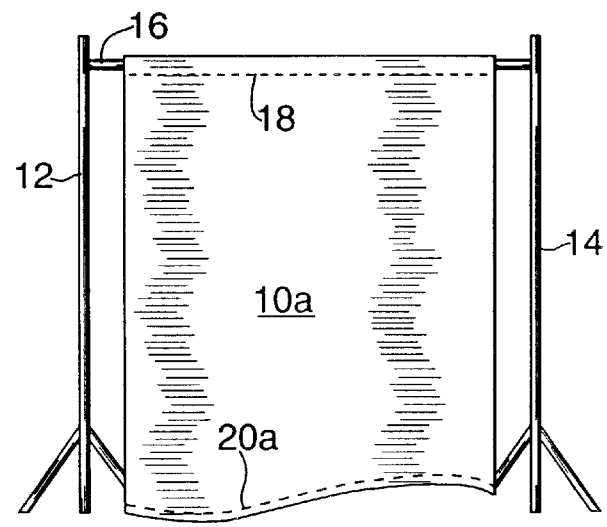
FIG. 3 is a side elevation view of a hanging backdrop according to the invention having one straight hem and one curved hem being hung straight.
Figure 4:
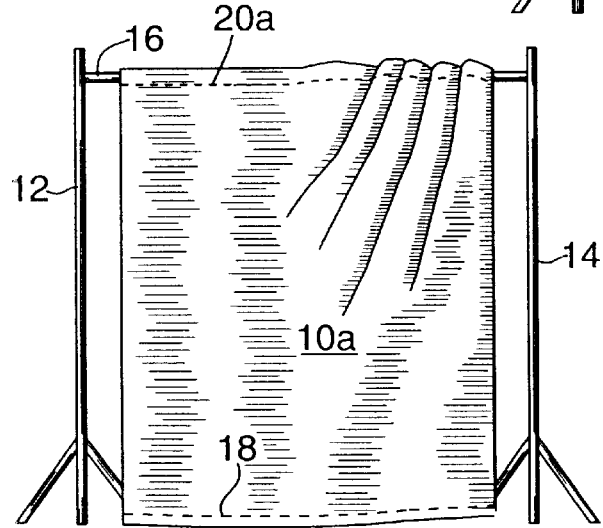
FIG. 4 is a side elevation view of the hanging backdrop of FIG. 3 being hung draped from the curved hem.

After paint or dye is applied, the material is preferably dried flat and then hemmed as shown in FIGS. 2–4. FIG. 2 shows a backdrop 10 according to the invention being suspended by a pole system 12, 14, 16. The pole system typically includes two vertical poles 12, 14 which support opposite ends of a horizontal pole 16. In order to hang the backdrop 10 on the horizontal pole 16, a hem 18 is provided by folding and stitching in a straight conventional manner. The hem stitching is preferably two to two and one half inches from the edge of the material to provide enough room for the pole to pass through the pocket formed by the hem. Preferably, two hems 18, 20 are provided at opposite ends of the material. As mentioned above, a self-draping hem may also be provided. FIGS. 3 and 4 show a backdrop 10a according to the invention having a straight hem 18 and a curved self-draping hem 20a. When the backdrop 10a is hung from the horizontal pole 16 using the curved hem 20a, a draping effect is automatically provided as shown in FIG. 4.

A 10'×20' backdrop according to the invention weighs less than 2.5 pounds and can be crushed to the size of a basketball. A comparably sized muslin backdrop weighs 10–15 pounds and cannot be crushed to a small size. After transporting the backdrop according to the invention, any wrinkles which may appear in the backdrop can be easily removed by re-crushing the backdrop one or two times. In fact, the more often the backdrop is crushed, the smoother it looks. Since the TYVEK® material is only partially absorbent, the backdrops according to the invention do not gain significant weight after painting. Typically, a 10'×20' backdrop according to the invention will gain about 0.25 pounds after painting. Since the backdrops are so light, they can be suspended from walls and ceilings with tape if no pole system is available.

Figure 5:
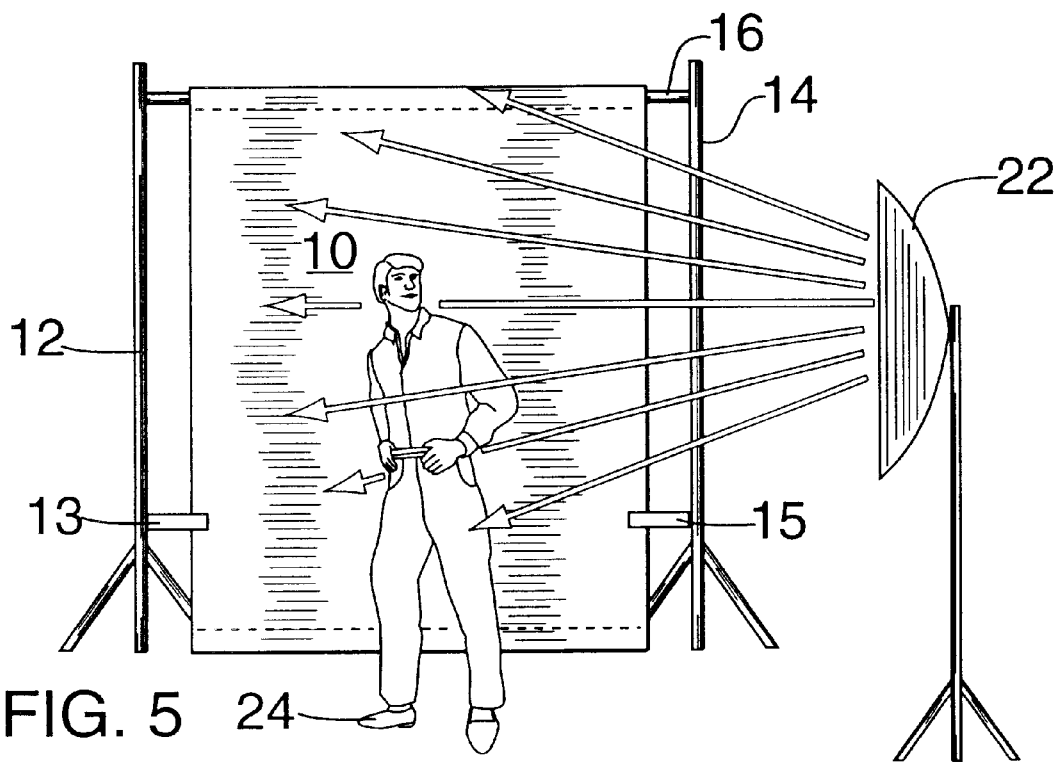
FIGS. 5 and 5a are mutually orthogonal side elevation views of a backdrop according to the invention with side lighting on a flat undraped surface.
Figure 5A:
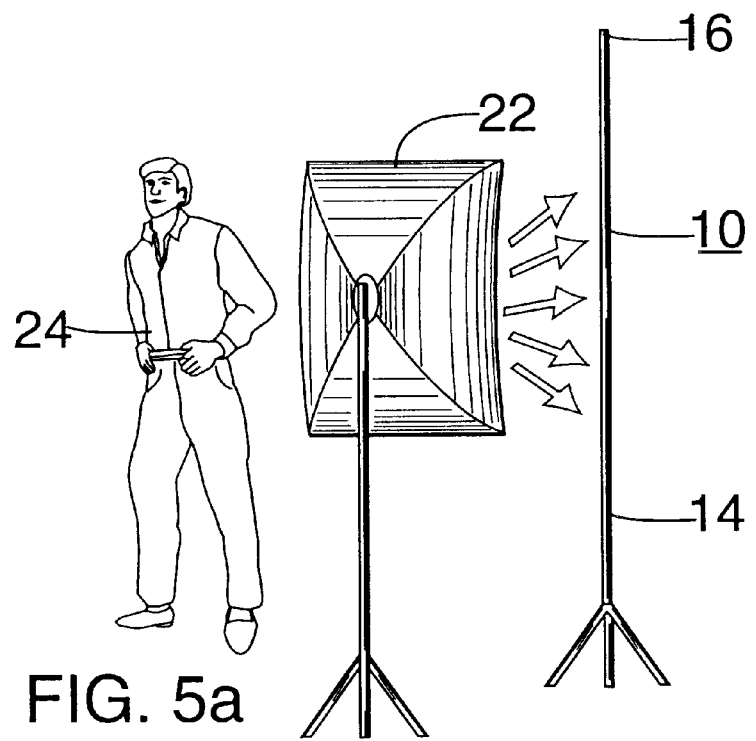

The backdrops according to the invention can be used in a variety of lighting conditions as shown in FIGS. 5–8. For example, as seen in FIGS. 5 and 5a, a backdrop 10 suspended from pole system 12, 14, 16, can be made to appear extremely flat with the use of tape 13 and 15 which pulls the backdrop taught between the poles 12 and 14. A side light 22 may be directed across the backdrop 10 in back of the subject 24. The arrangement shown in FIGS. 5 and 5a may be used with a white backdrop or a colored backdrop.

Figure 6:
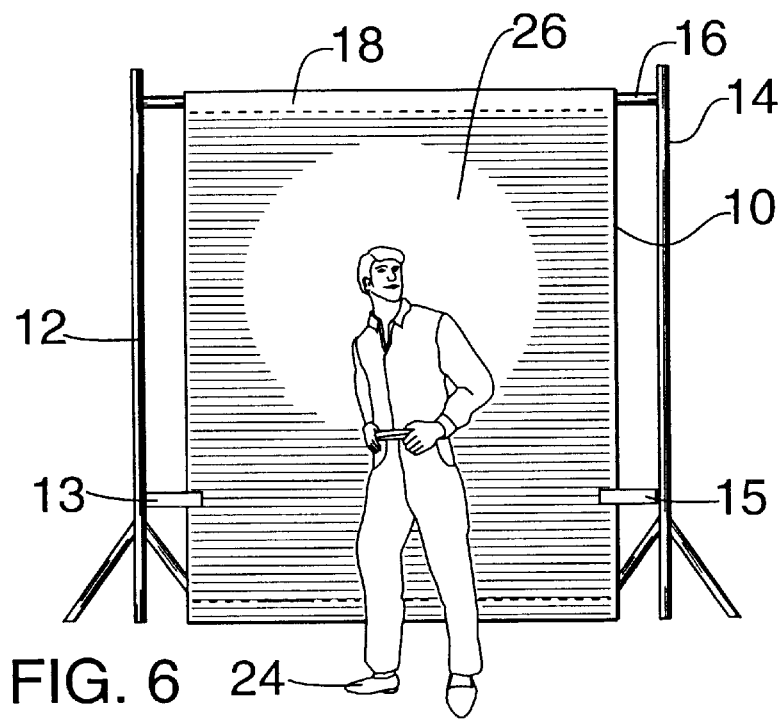
FIGS. 6 and 6a are mutually orthogonal side elevation views of a backdrop according to the invention with back lighting for a hot spot on a colored backdrop.
Figure 6A:
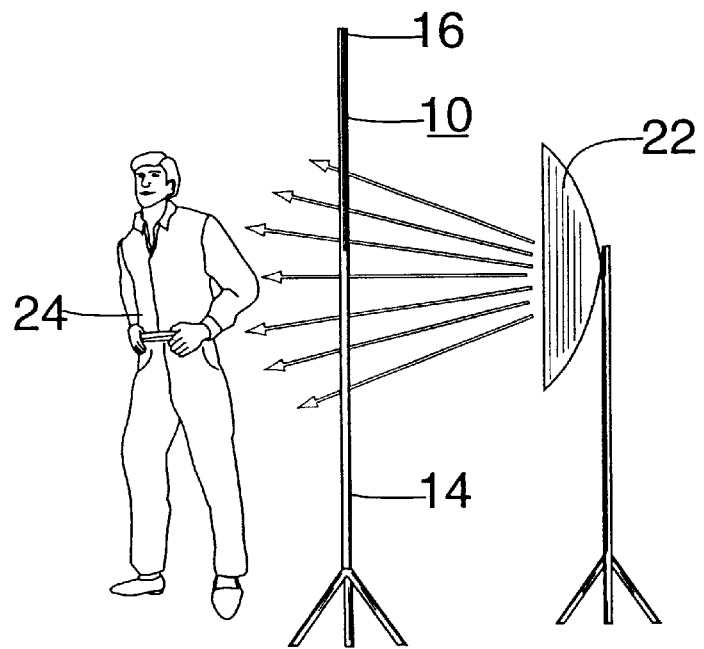

A similar backdrop arrangement can be used with a back light 22 as shown in FIGS. 6 and 6a to create a hot spot 26 behind the subject 24. When used with a color backdrop 10, the hot spot 26 produces an area of washed out color or even a white appearance surrounded by color. Since the backdrop is relatively thin, the intensity of the back light 22 need not be as high as would be necessary to back light muslin.

Figure 7:
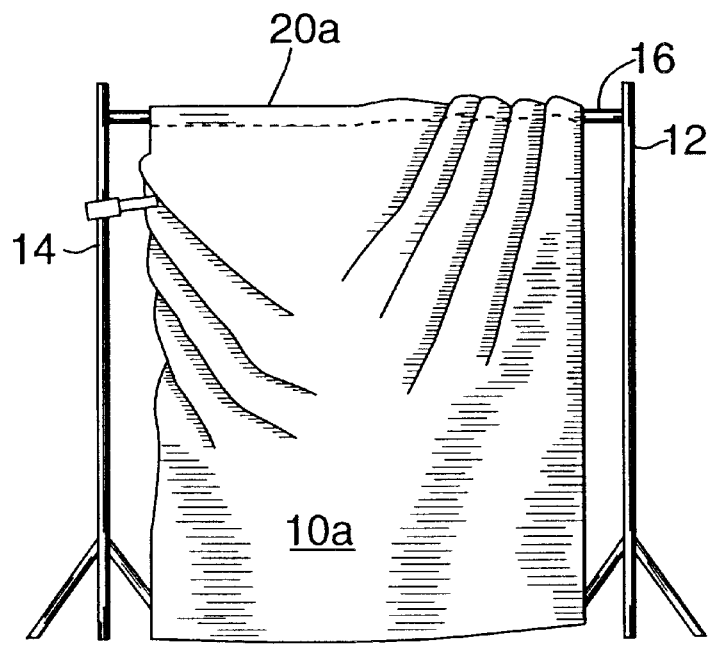
FIGS. 7 and 7a are front and rear side elevation views of a backdrop according to the invention with cross gel lighting on a fully draped white backdrop.
Figure 7A:
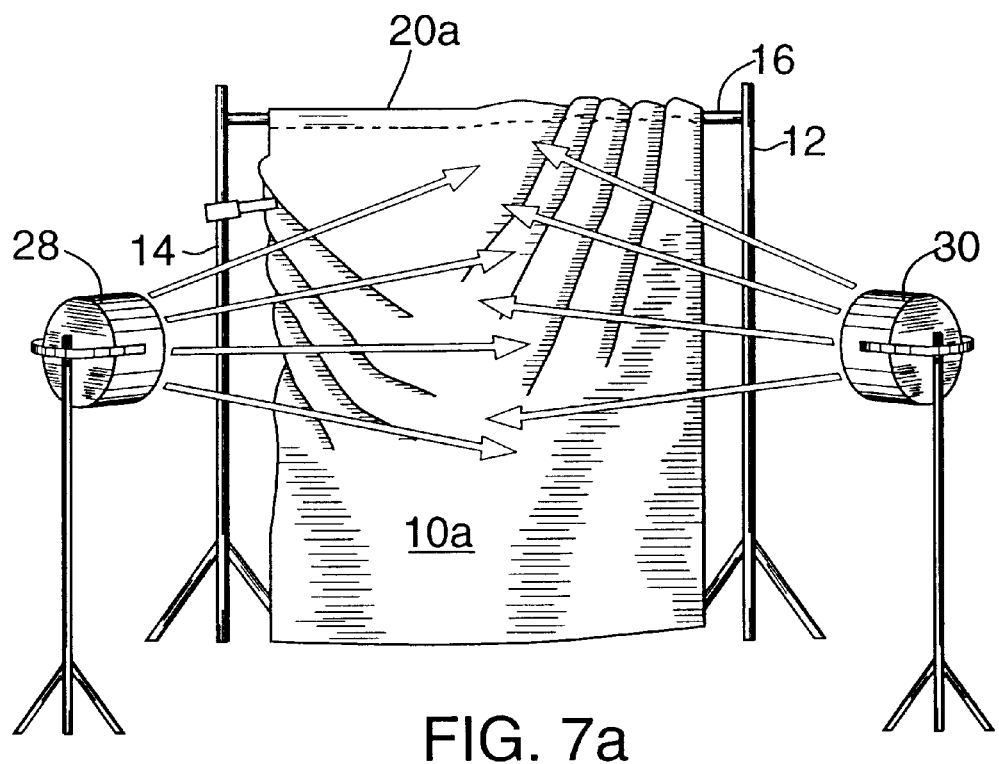
Figure 8:
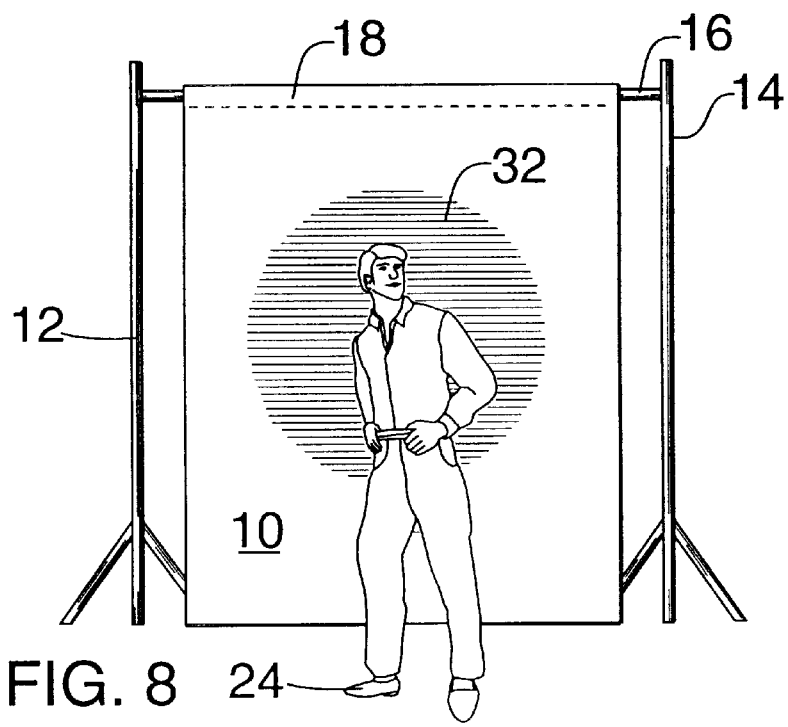
FIGS. 8 and 8a are mutually orthogonal side elevation views of a backdrop according to the invention with back gel lighting for a colored hot spot on a white backdrop.
Figure 8A:
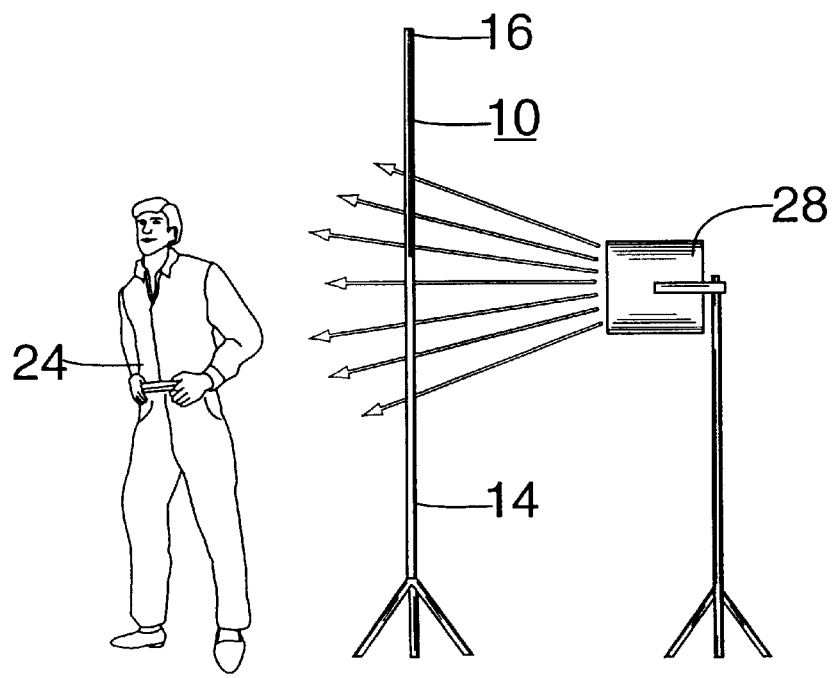

The backdrops according to the invention also respond well to gel lighting. A shown in FIGS. 7 and 7a, a draped white backdrop 10a may be cross gelled with two lights 28, 30 at two different angles without distracting wrinkles. As shown in FIGS. 8 and 8a, rear gel lighting of a white backdrop 10 with a gel light 28 produces a reverse hot spot of color 32 behind the subject 24.

From the foregoing, those skilled in the art will appreciate that the backdrops according to the invention can be used in virtually unlimited lighting conditions to produce infinitely different results, limited only by the imagination of the photographer.

Figure 9:
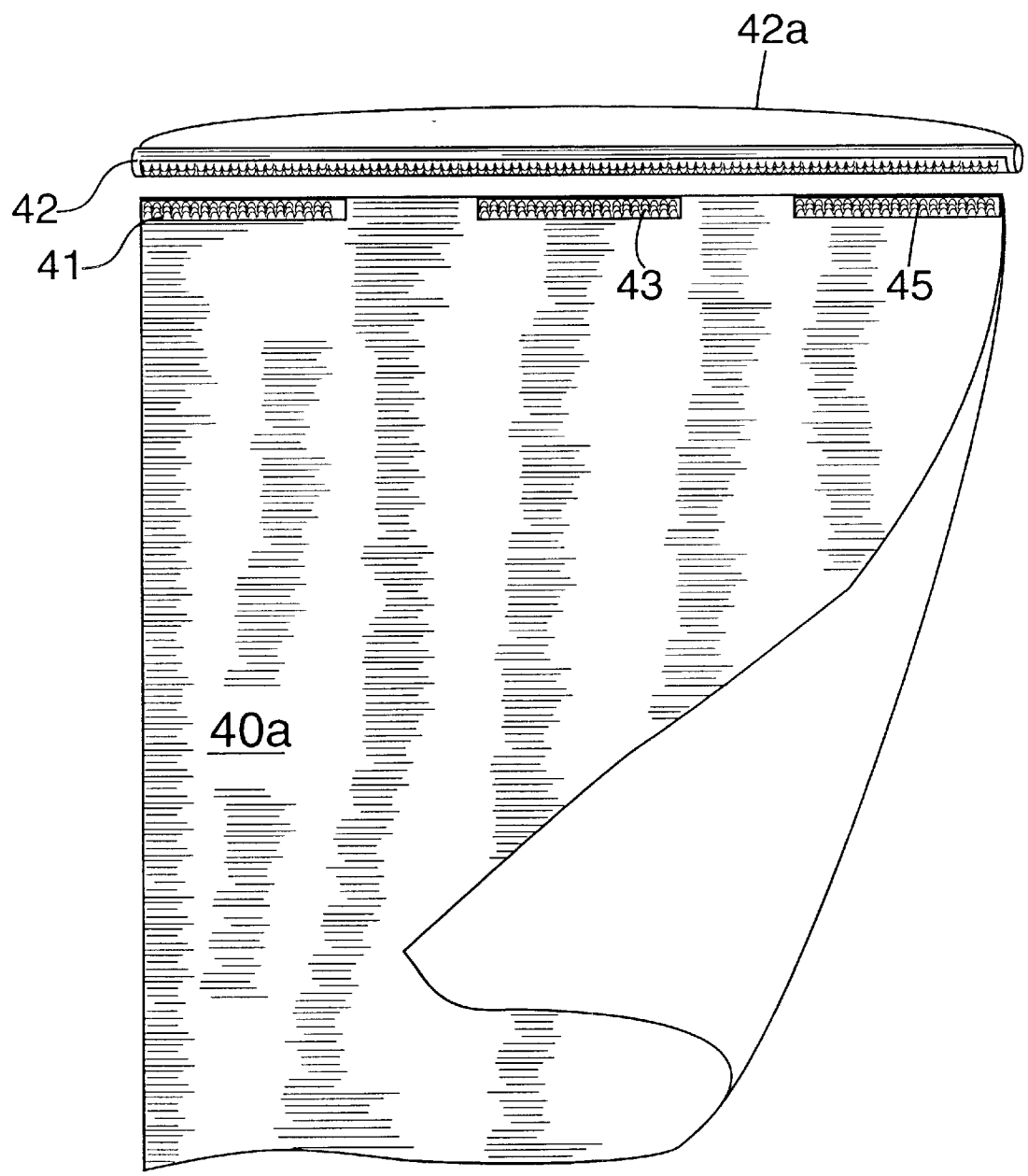
FIG. 9 is an enlarged perspective view of a backdrop according to the invention with VELCRO® strips and a wooden dowel for hanging on a monopole.
Figure 9A:
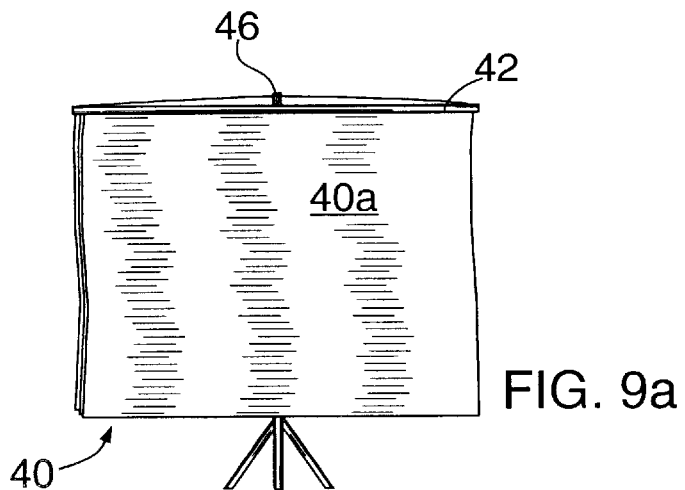
FIG. 9a is a view similar to FIG. 9 of multiple backdrops according to the invention affixed to a wooden dowel hanging from a monopole.
Figure 9B:
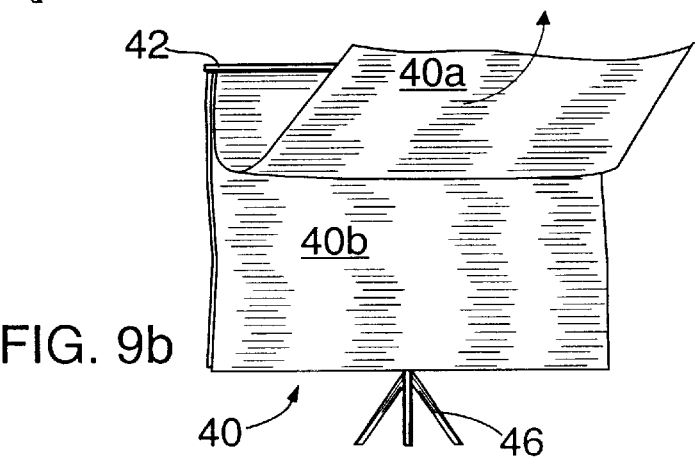
FIG. 9b is a view similar to FIG. 9a showing how one of the multiple backdrops can be flipped to reveal another of the backdrops.
Figure 9C:
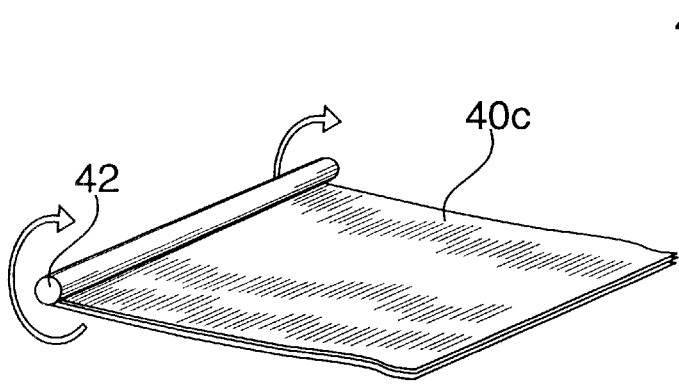
FIG. 9c is a perspective view of the multiple backdrops being rolled onto the dowel.
Figure 9D:
FIG. 9d shows the backdrops of the invention rolled onto the dowel and carried in a shoulder bag.

Turning now to FIGS. 9 and 9a–9d, a portrait photographer's kit 40 according to the invention includes three six by seven foot backdrops 40a–40c, a wooden dowel 42, and an optional carrying case 44. The backdrops 40a–40c may be permanently attached to the dowel 42 or may be provided with VELCRO® strips, e.g. 41, 43, 45, for removably attaching the backdrops to the dowel. The dowel 42 is preferably provided with a cord 42a for suspending the dowel from a monopole 46 as shown in FIG. 9a which may or may not be included in the kit 40. The backdrops 40a–40c may be different colors or imprinted or painted with different designs. Different backdrops are easily selected by flipping them over the dowel 42 as shown in FIG. 9*b*. The backdrops are conveniently rolled onto the dowel as shown in FIG. 9*c* so they can be inserted into the carrying case 44 as shown in FIG. 9*d*. Those skilled in the art will appreciate that the number and size of the backdrops attached to the dowel may be varied as desired. Typically, three of such backdrops will be placed in a dowel, totaling about six pounds.

When one desires a white backdrop, the slick side of the 1422R TYVEK® sheet that has a hydrophobic nature (resistance to water) is used; this can be cleaned of light dirt. This is hand crushed/commercially laundered to soften the fibers to a degree that makes these drops extremely crushable and drapeable, along with its ability to hang up and be photographed with a flat appearance. As previously mentioned, hems can be either straight or curved and the backdrop normally comes with both. Optionally, one may spray the slick side with SCOTCHGUARD™ (contents: napthol spirits, carbon dioxide, hepthane, and flouroaliphatic resin) (aerosol can) for further protection and wipeability, preferably by spraying using an aerosol can to obtain a uniform coat.

There have been described and illustrated herein several embodiments of a photographer's backdrop and methods of making it. While particular embodiments of the invention have been described, it is not intended that the invention be limited thereto, as it is intended that the invention be as broad in scope as the art will allow and that the specification be read likewise. Thus, while particular dimensions have been disclosed, it will be appreciated that other dimensions could be utilized. Also, while particular types of paint have been disclosed, it will be recognized that other types of paint, dye, or commercial printing could be used with similar results obtained. Moreover, while particular configurations have been disclosed in reference to hanging the backdrop, it will be appreciated that other configurations could be used as well. Furthermore, while the backdrop has been disclosed as having particular types of hems, it will be understood that different hems can achieve the same or similar function as disclosed herein. Although the presently preferred embodiment of the invention utilizes DuPont TYVEK® #1422R, other grades of spun bonded olefin may produce the same or similar results. It will therefore be appreciated by those skilled in the art that yet other modifications could be made to the provided invention without deviating from its spirit and scope as so claimed.

I claim:

1. A method of making a lightweight, dyed, opaque, easily transportable photographer's backdrop, comprising the steps of:
    a) obtaining a sheet of opaque spunbonded olefin material;
    b) mechanically manipulating said sheet to break down fibers in said material until it is supple and drapable;
    c) mixing a dye and a carrier agent to provide a dye mixture; and
    d) applying an effective amount of said mixture to said sheet so as to produce a dyed sheet which remains supple and drapable, and is compactable and re-crushable to remain supple and drapable.

2. A method according to claim 1, wherein said carrier agent comprises water.

3. A method according to claim 1, wherein said carrier agent comprises water and alcohol.

4. A method according to claim 1, wherein said carrier agent comprises a material selected from the group consisting of low molecular weight alcohols, isopropyl, phenol, and a combination thereof.

5. The method according to claim 1, wherein said mixture of dye and carrier agent comprises generally the following proportions:
    one to ten teaspoons of dye to 2 gallons of water and alcohol solution.

6. A method according to claim 1, wherein said mixture is applied to said sheet prior to mechanically manipulating said sheet.

7. A method according to claim 1, wherein said step of mechanically manipulating said sheet is performed during said step of applying an effective amount of said mixture to said sheet.

8. A method according to claim 1, further comprising the steps of mechanically manipulating said sheet a second time subsequent to applying said mixture.

9. The method according to claim 1 wherein said step of mechanically manipulating said sheet comprises laundering said sheet.

10. The method according to claim 9 wherein said step of laundering is performed at a temperature below 150 degrees Fahrenheit.

11. A method according to claim 1, wherein said spunbonded olefin material has the properties of DuPont TYVEK® #1422R.

12. A method according to claim 1, further comprising providing at least one hem along an edge of said sheet.

13. A photographer's backdrop, comprising:
    a sheet of opaque spunbonded olefin material, said material being mechanically manipulated to break down the fibers in said material until it supple and drapable; and
    at least one of paint and dye applied to said sheet, wherein said at least one of painted and dyed sheet remains supple and drapable, and is compactable and re-crushable to remain supple and drapable.

14. A photographer's backdrop according to claim 13, wherein said paint comprises acrylic paint.

15. A photographer's backdrop according to claim 13, wherein said dye is a dispersed dye.

16. A photographer's backdrop according to claim 13, wherein said spunbonded olefin material has the properties of DuPont TYVEK® #1422R and has an non-absorbent side and a relatively absorbent side.

17. A photographer's backdrop according to claim 16, wherein said paint is applied to said absorbent side.

18. A photographer's backdrop kit, comprising:
    a) a plurality of sheets of opaque spunbonded olefin material, said material being mechanically manipulated to break down the fibers in said material until it supple and drapable; and
    at least one of paint and dye applied to said sheet, wherein said at least one painted and dyed sheet remains supple and drapable, and is compactable and re-crushable to remain supple and drapable,
    b) a dowel, wherein
    each of said plurality of sheets is attached to said dowel.

19. A kit according to claim 18, wherein said dowel is provided with means for suspending said dowel from a monopole.

20. A kit according to claim 18, further comprising a carrying case sized to receive said dowel with said plurality of sheets rolled onto said dowel.

* * * * *